A. R. BARTRAM,
Assignor to J. IVES.
Carriage-Pole.
No. 8,253. Reissued May 28, 1878.
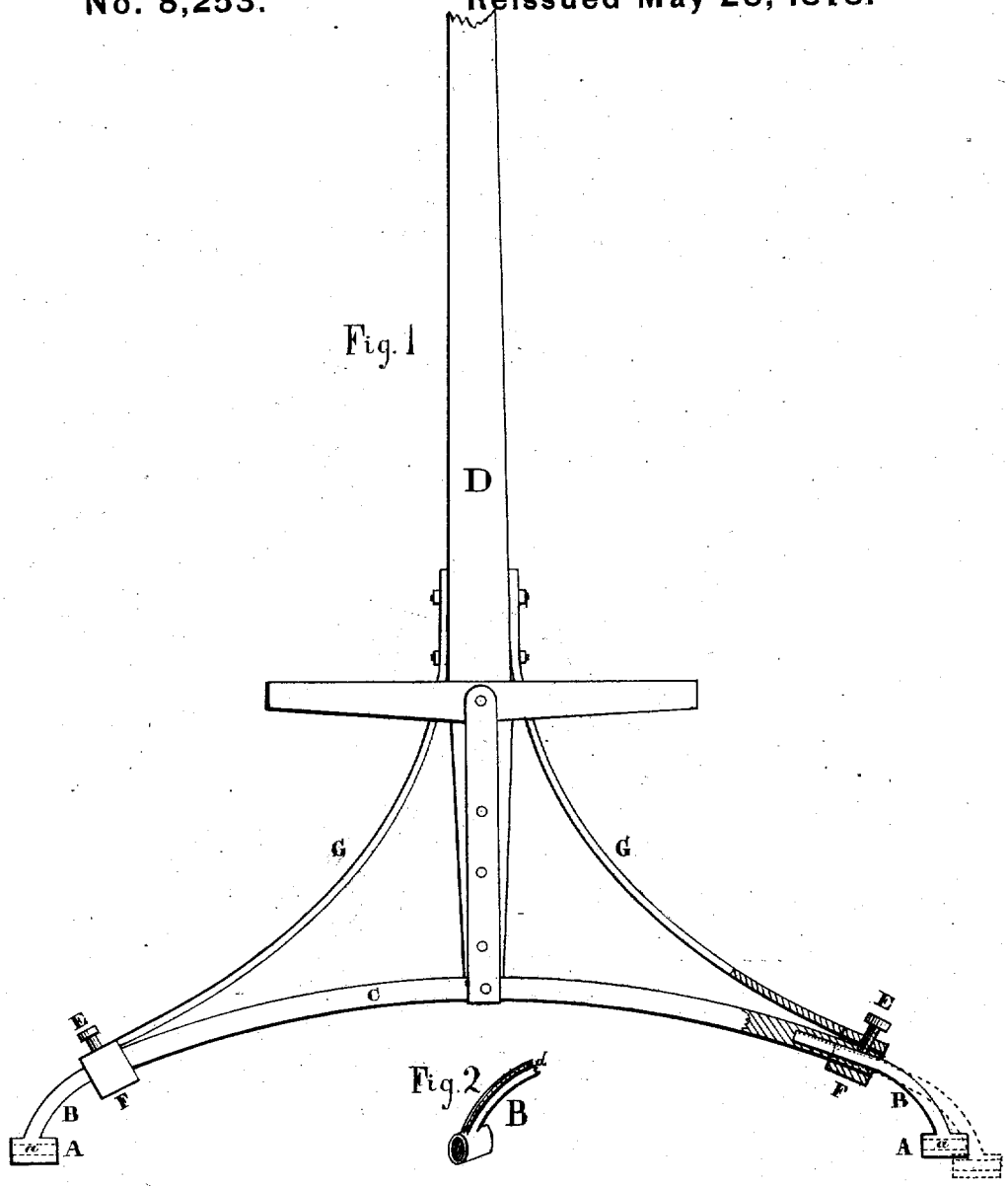
Witnesses
Henry A. Hove
Wm. E. Augur.
Aaron R. Bartram
by
James H. Webb
his attorney
N. PETERS, PHOTO-LITHOGRAPHER, WASHINGTON D.C.

UNITED STATES PATENT OFFICE.

AARON R. BARTRAM, OF REDDING, ASSIGNOR TO JAMES IVES, OF MOUNT CARMEL, CONNECTICUT.

IMPROVEMENT IN CARRIAGE-POLES.

Specification forming part of Letters Patent No. 64,936, dated May 21, 1867; Reissue No. 8,253, dated May 28, 1878; application filed April 4, 1878.

*To all whom it may concern:*

Be it known that I, A. R. BARTRAM, of Redding, in the county of Fairfield and State of Connecticut, have invented a new and useful Improvement in Carriage Poles or Thills; and I do hereby declare the following to be a full, clear, and exact description of the same, reference being had to the accompanying drawings, which form a part of this specification.

The object of my invention is to furnish a light, strong, simple, and durable carriage pole, or thills, consisting of a certain construction, combination, and arrangement of parts, which I describe as follows:

The cross-bar C (represented in Figure 1) may be constructed of gas-pipe or other tubular metal of proper size, and may be either curved or straight, as shown; or, if desirable, as it may be for heavy carriages, it may be made of solid material, with sockets in the ends to admit the shanks B B. These portions within which the shanks B B are inserted must, however, be straight when the couplings need to be adjustable; otherwise the axial lines of the coupling-eyes would not coincide except when in one certain position, and the utility of the device would be destroyed. The coupling-eyes A A are forged upon short bars or shanks B B, which are bent in proper form to enter the sockets of the cross-bar C, to which the pole or thills are attached, and strengthened by the braces G G. The shank B has a groove or spline cut upon its surface, as shown in Fig. 2, to receive the point of the set-screw E, which secures the shank firmly in its place; or the shank may be held in place by some other convenient device.

It will be seen that by a lateral movement of the shanks B B the pole or thills I have described can be readily adjusted to different vehicles in which the distance between the coupling-clips is not the same.

Having thus described my invention, what I claim as new, and desire to secure by Letters Patent, is—

1. The coupling A and the shank B, in combination with the cross-bar C, substantially as set forth.

2. The shank B of the coupling A and the set-screw E, or other device for confining the coupling in any particular location, in combination with the cross-bar C, substantially as and for the purposes described.

AARON R. BARTRAM.

Witnesses:

ROGER AVERILL,

ARTHUR H. AVERILL.